(12) United States Patent
Ookuma (10) Patent No.: US 8,077,335 B2
(45) Date of Patent: Dec. 13, 2011

(54) IMAGE PROCESSING APPARATUS, MOBILE TERMINAL APPARATUS, IMAGE PROCESSING SYSTEM AND CONTROL METHOD

(75) Inventor: Satoshi Ookuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 11/845,360

(22) Filed: Aug. 27, 2007

(65) Prior Publication Data

US 2008/0058012 A1 Mar. 6, 2008

(30) Foreign Application Priority Data

Aug. 30, 2006 (JP) ................................. 2006-234292

(51) Int. Cl.
*H04N 1/00* (2006.01)
*H04M 1/00* (2006.01)

(52) U.S. Cl. ....... 358/1.15; 358/1.6; 358/1.13; 358/468; 455/41.3; 455/557; 715/764

(58) Field of Classification Search .................... 358/1.6, 358/1.13, 1.15, 448, 468; 455/41.2, 41.3, 455/557; 715/769, 770, 764
See application file for complete search history.

(56) References Cited

U.S. PATENT DOCUMENTS

| | | | | |
|---|---|---|---|---|
| 6,134,017 A * | 10/2000 | Schlank et al. | ............... | 358/1.15 |
| 6,633,413 B1 * | 10/2003 | Schlank et al. | ............... | 358/468 |
| 6,697,090 B1 * | 2/2004 | Nagasaka et al. | ............. | 715/769 |
| 6,725,300 B1 * | 4/2004 | Nagasaka et al. | ............... | 710/62 |
| 7,069,516 B2 * | 6/2006 | Rekimoto | ....................... | 715/757 |
| 2001/0044858 A1 * | 11/2001 | Rekimoto | .......................... | 710/1 |
| 2003/0181995 A1 * | 9/2003 | Nagasaka et al. | ............... | 700/19 |
| 2004/0024884 A1 * | 2/2004 | Rekimoto et al. | ............. | 709/228 |
| 2004/0051912 A1 * | 3/2004 | Schlank et al. | ............... | 358/468 |
| 2004/0128349 A1 * | 7/2004 | Maruyama | .................... | 709/203 |
| 2005/0038530 A1 * | 2/2005 | Nagasaka et al. | ............... | 700/19 |
| 2006/0023253 A1 * | 2/2006 | Byun et al. | .................... | 358/1.15 |
| 2007/0266319 A1 * | 11/2007 | Matsuo | ......................... | 715/700 |
| 2009/0036054 A1 * | 2/2009 | Rekimoto et al. | ........... | 455/41.2 |
| 2009/0109468 A1 * | 4/2009 | Barclay et al. | ............... | 358/1.15 |
| 2009/0113291 A1 * | 4/2009 | Barclay et al. | ................ | 715/243 |
| 2009/0315867 A1 * | 12/2009 | Sakamoto et al. | ............ | 345/184 |
| 2010/0304675 A1 * | 12/2010 | Rekimoto et al. | ........... | 455/41.2 |
| 2011/0058228 A1 * | 3/2011 | Inamoto et al. | ............... | 358/448 |
| 2011/0058711 A1 * | 3/2011 | Noda et al. | .................... | 382/116 |
| 2011/0219333 A1 * | 9/2011 | Park | .............................. | 715/808 |

FOREIGN PATENT DOCUMENTS

| | | | |
|---|---|---|---|
| JP | 8-272715 A | | 10/1996 |
| JP | 2005-242781 A | | 9/2005 |

* cited by examiner

*Primary Examiner* — Kimberly A Williams (57) ABSTRACT

An image processing apparatus includes a display unit adapted to display an image processing object corresponding to a predetermined image processing, a designation unit adapted to designate data specified by a terminal device when the image processing object displayed on the display unit is selected, a reception unit adapted to receive the data designated by the designation unit, and a control unit adapted to perform image processing corresponding to the selected image processing object.

8 Claims, 10 Drawing Sheets

IMAGE PROCESSING APPARATUS, MOBILE TERMINAL APPARATUS, IMAGE PROCESSING SYSTEM AND CONTROL METHOD

BACKGROUND OF THE INVENTION

1. Field of the Invention

The present invention relates to an image processing apparatus, a terminal device, and an image processing system.

2. Description of the Related Art

An image processing apparatus such as a copying machine and a printer can be directly connected to a mobile terminal apparatus (hereinafter referred to as a mobile terminal) such as a digital camera, a mobile telephone a personal digital assistant (PDA), and a mobile personal computer (PC) to print an image and data in these mobile terminals.

Normally, when an image processing apparatus is connected to a mobile terminal, an operation screen for transferring data is displayed on a display device of the image processing apparatus. Files of the mobile terminal are listed on the display device of the image processing apparatus, an operation target is selected on the display, and an actual operation such as printing is specified.

When a mobile terminal, such as a notebook PC and a tablet PC, is equipped with a display device of relatively high resolution, the process contents of the image processing apparatus can be displayed and specified on the display device of the mobile terminal when an image processing apparatus communicates with the mobile terminal. Furthermore, a folder of the image processing apparatus can be displayed, a file of the mobile terminal can be dragged and dropped onto the folder, the file transmitted to the image processing apparatus, and the process contents can be specified on the display device of the image processing apparatus.

According to Japanese Patent Application Laid-Open No. 2005-242781, a virtual folder called a "hot folder" is displayed, and a file to be printed is dragged and dropped onto the folder, thereby printing data.

Also according to Japanese Patent Application Laid-Open No. H08-272715, a file is dragged and dropped onto a window having a specific function, thereby specifying a transfer of a file to a remote destination.

In the above-mentioned process specifying operation between the image processing apparatus and the mobile terminal, a file of the mobile terminal is displayed on the display device of the image processing apparatus. Generally, the method of displaying a file on an image processing apparatus is different from the method of a mobile terminal in many cases, and a user unfamiliar with operations of an image processing apparatus often takes a long time to operate the apparatus.

In addition, when the display device of a mobile terminal displays a symbol, such as a hot folder, of a process of an image processing apparatus, the mobile terminal, such as a PDA, having a relatively narrow display area requires further narrowing another display area for display of a folder, thereby incurring poor operability.

It is often technically difficult for a mobile terminal having no window system to display a hot folder, thereby failing in adopting the above-mentioned method.

Furthermore, in transferring data using a hot folder, it is necessary to transfer data to an image processing apparatus by dragging and dropping the data onto the hot folder when the data is compressed between equipment units, and then to transfer the data to a target processing function.

SUMMARY OF THE INVENTION

To solve the above-mentioned problems, an image processing apparatus according to the present invention includes a display unit configured to display an image processing object corresponding to a predetermined image processing, a designation unit configured to designate data specified by a terminal device when the image processing object displayed on the display unit is selected, a reception unit configured to receive the data designated by the designation unit, and a control unit configured to perform image processing corresponding to the selected image processing object.

Further features and aspects of the present invention will become apparent from the following detailed description of exemplary embodiments with reference to the attached drawings.

DESCRIPTION OF THE EMBODIMENTS

An exemplary embodiment of the present invention is described below with reference to the attached drawings.

Figure 1:
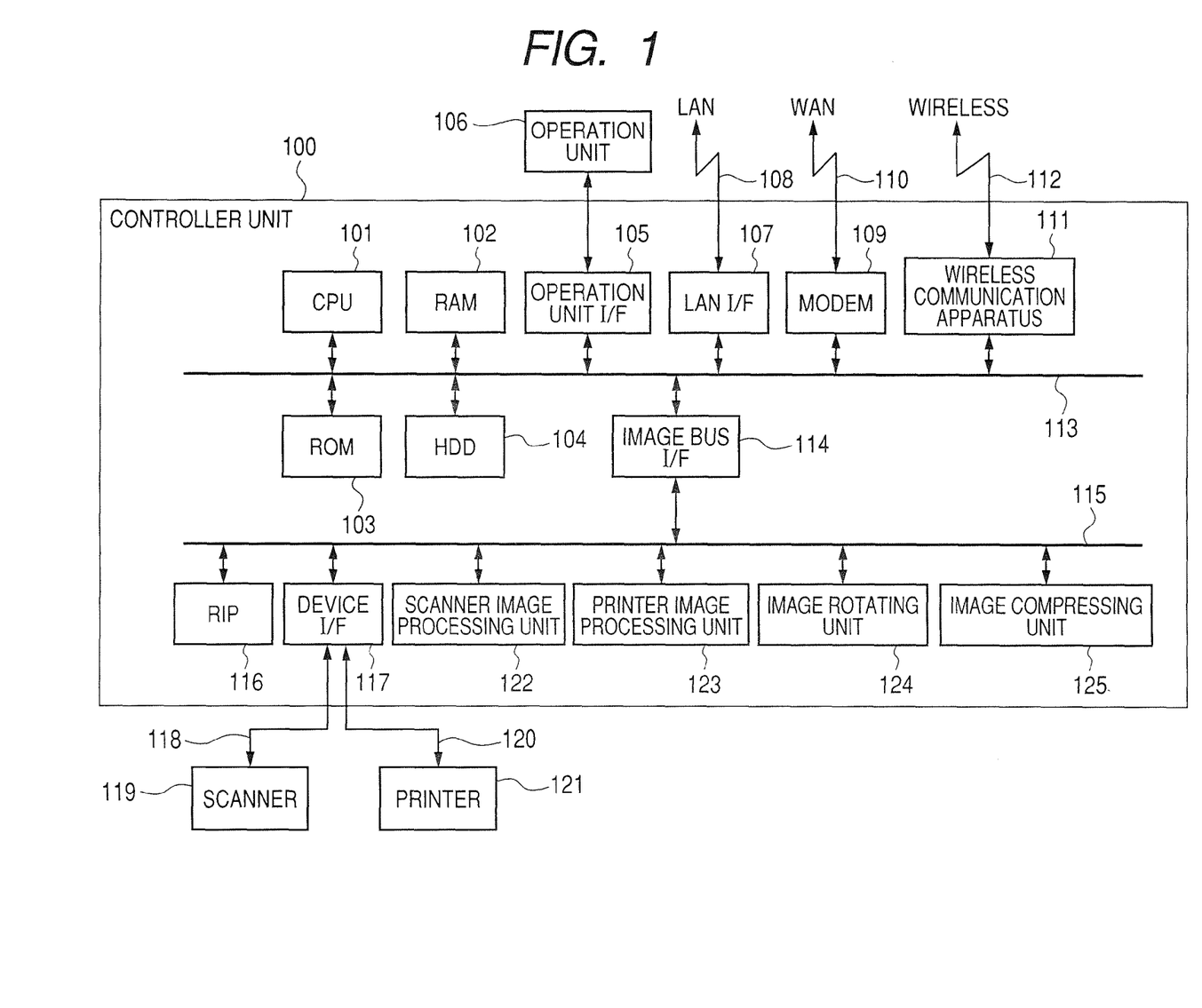
FIG. 1 is a block diagram of the internal configuration of an image processing apparatus according to an exemplary embodiment of the present invention.

FIG. 1 is a block diagram of the internal configuration of the image processing apparatus according to an exemplary embodiment of the present invention.

The image processing apparatus is provided with a controller unit 100 connected to a scanner 119 and a printer 121 as illustrated in FIG. 1, and also to a LAN 108, a public line (WAN) 110, and a wireless communication 112.

The controller unit 100 performs control of a copy function, a printer function of printing data supplied from external equipment through the LAN 108 and the wireless communication 112, output/input of image information and device information, and control of the entire image processing apparatus. The controller unit 100 also performs control of communication function including a FAX function through the public line (WAN) 110.

The controller unit 100 includes a CPU 101 adapted to execute various control programs. The CPU 101 activates a system based on a boot program stored in ROM 103, reads the control program stored in an HDD (hard disk device) 104 on the system, and performs a predetermined process using RAM 102 as a work area. The HDD 104 stores the above-mentioned various control programs and image data.

Connected to the CPU 101 via a system bus 113 are the RAM 102, the ROM 103, the HDD 104, an operation unit I/F (operation unit interface) 105, a LAN I/F (LAN interface) 107, a modem 109 and a wireless communication apparatus 111. In addition, an image bus I/F (interface) 114 is also connected to the CPU 101 via the system bus 113.

The operation unit I/F 105 is an interface with the operation unit 106, transfers image data displayed on an operation unit 106 to the operation unit 106, and transfers a signal generated by inputting an operation performed by the operation unit 106 to the CPU 101.

The operation unit 106 includes a display unit adapted to display an information input screen for input of the current settings of each function and setting information about each function relating to image processing, and an input unit including keys for a user to input setting information for each function.

The LAN I/F 107 is connected to the LAN 108, and inputs and outputs information through the LAN 108. The modem 109 is connected to the public line 110, and inputs and outputs information through the public line 110. The wireless communication apparatus 111 is connected to a wireless network/interface 112, and communicates data with another device capable of performing wireless communication. The image bus I/F 114 connects an image bus 115 with the system bus 113 and functions as a bus bridge for conversion of a data structure.

The image bus 115 is configured by a PCI bus capable of transferring image data at a high speed or a bus on the basis of the IEEE 1394 standards. Connected to the image bus 115 is a RIP (raster image processor) 116, a device I/F (device interface) 117, a scanner image processing unit 122, a printer image processing unit 123, an image rotating unit 124, and an image compressing unit 125.

The RIP 116 develops a PDL code into a bit map image. The device I/F 117 connects the scanner 119 and the printer 121 as image input/output devices with the controller unit 100, and converts image data of a synchronous/asynchronous system. In this example, the device I/F 117 is connected with the scanner 119 via a cable 11, and the device I/F 117 is connected with the printer 121 via a cable 120.

The scanner image processing unit 122 corrects, processes, and edits input image data. The printer image processing unit 123 corrects a printer, and converts resolution for the print output image data. The image rotating unit 124 rotates image data. The image compressing unit 125 performs the JPEG on multivalued image data, and performs compression and decompression such as the JBEG, MMR, MH, etc. on binary image data.

Thus, the CPU 101 of the controller unit 100 integrally controls the access to various devices connected to the system bus 113 based on each control program, and reads the image information from the scanner 119 through the device I/F 117. Furthermore, the CPU 101 of the controller unit 100 performs a predetermined process on the read image information, and then performs control by outputting the image information to the printer 121 through the device I/F 117.

Figure 2:
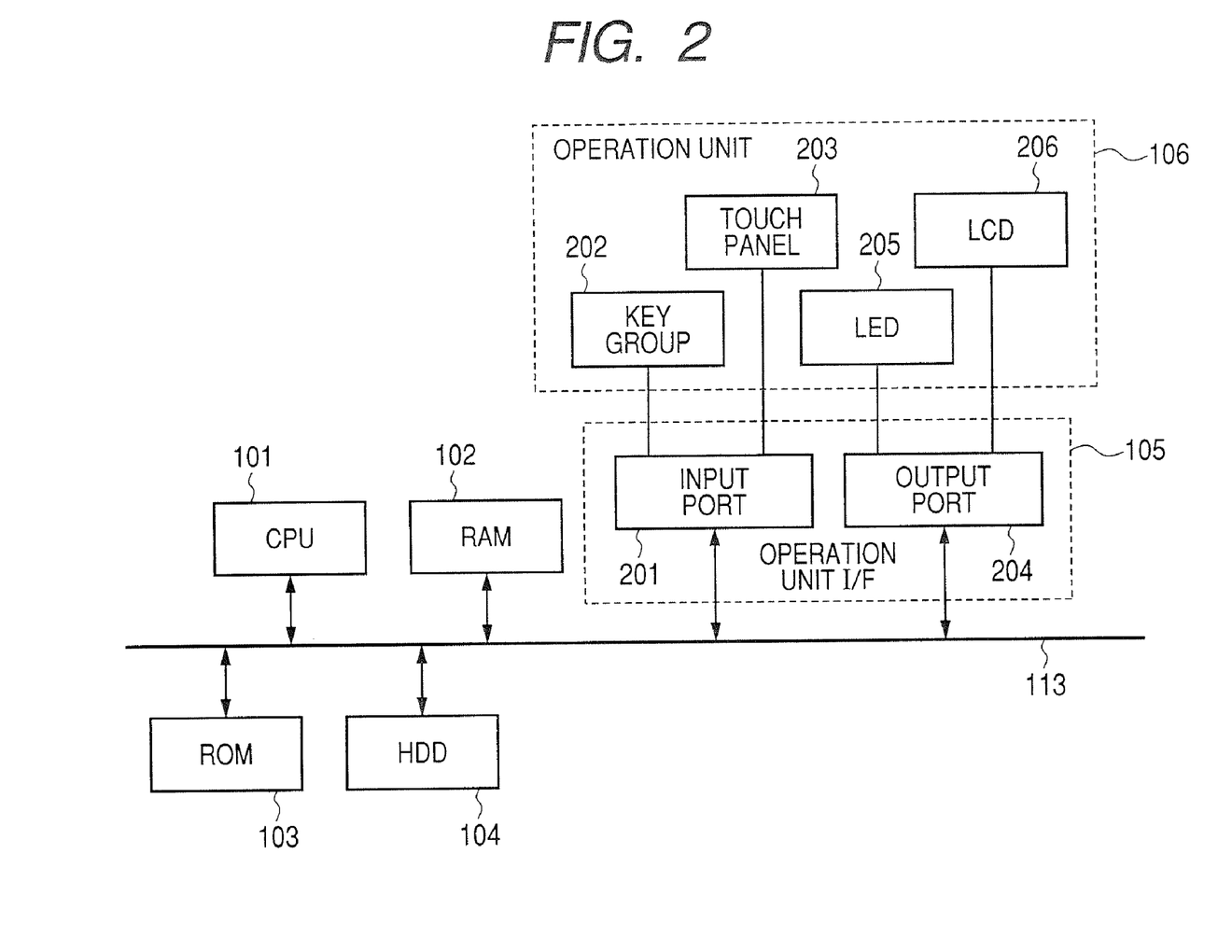
FIG. 2 is a block diagram of the configuration of an operation unit 106 and peripheral units.

The control performed by the CPU 101 on the operation unit 106 is described below with reference to FIG. 2. FIG. 2 is a block diagram of the configuration of the operation unit 106 and the peripheral units.

The operation unit 106 includes a touch panel 203 and a key group 202, each of which are connected to an input port 201 of the operation unit I/F 105. The position information indicating the press position of the touch panel 203 and the key information corresponding to pressing of the key group 202 are input to the CPU 101 through the input port 201. An LED 205 and an LCD 206 of the operation unit 106 are connected an output port 204 of the operation unit I/F 105.

Figure 3:
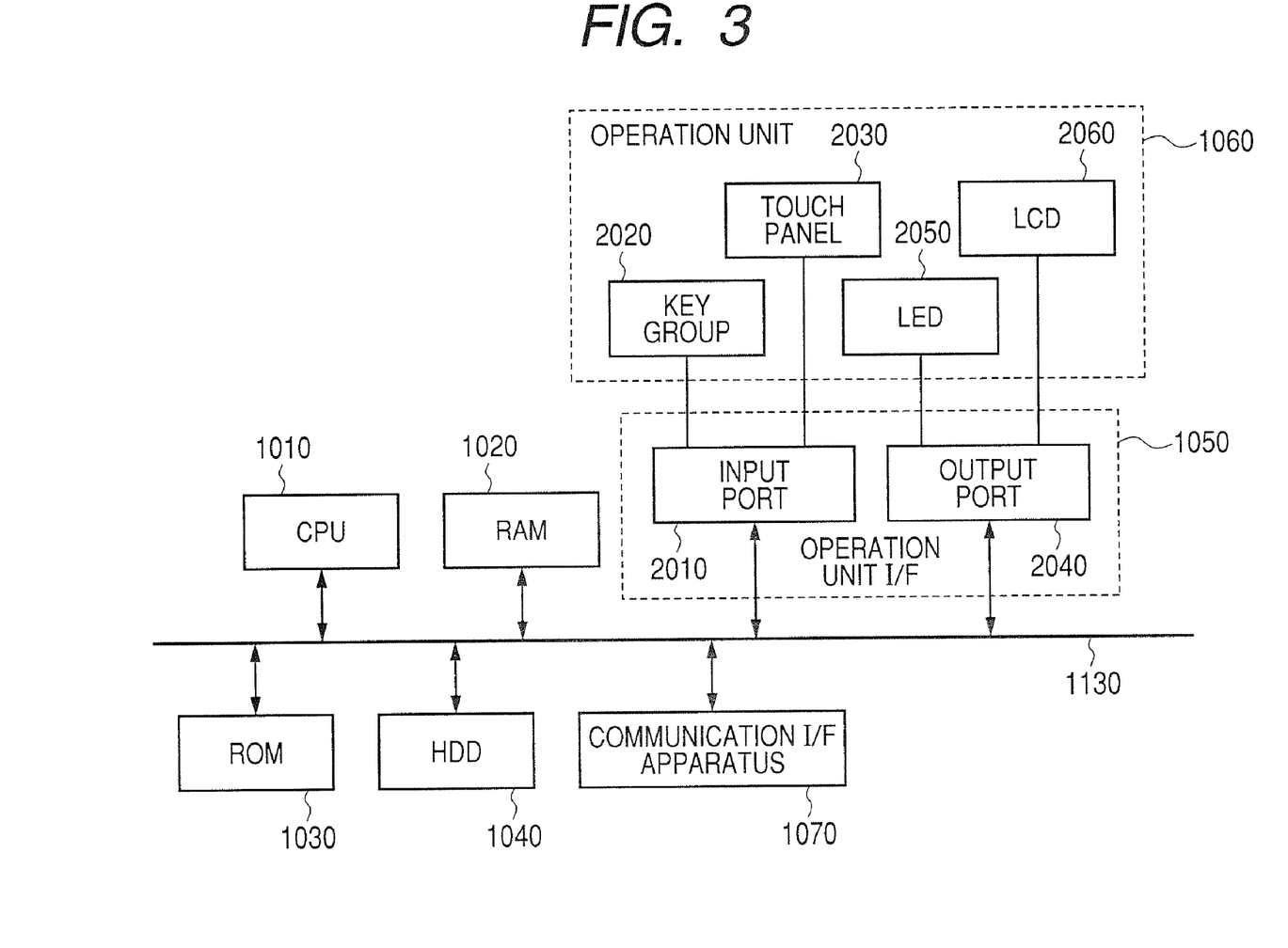
FIG. 3 is a block diagram of the internal configuration of a mobile terminal according to an exemplary embodiment of the present invention.

FIG. 3 is a block diagram of the internal configuration of the mobile terminal according to the exemplary embodiment of the present invention. In an operation unit 1060, a touch panel 2030 and a key group 2020 are connected to an input port 2010 of an operation unit I/F 1050.

The position information indicating the press position of the touch panel 2030 and the key information corresponding to pressing of the key group 2020 are input to the CPU 1010 through the input port 2010. An LED 2050 and an LCD 2060 of the operation unit 1060 are connected to an output port 2040 of the operation unit I/F 1050.

The system is activated based on the boot program stored in the CPU 1010 and ROM 1030, a control program stored in an HDD (hard disk device) 1040 is read on the system, and a predetermined process is performed by using RAM 1020 as a work area. The HDD 1040 stores the above-mentioned various control programs and also a document file described below. All of the above described components/units are connected via bus 1130.

A communication I/F apparatus 1070 corresponds to the LAN I/F 107 of the image processing apparatus and the wireless communication apparatus, and inputs and outputs information (or data) through a network.

Figure 4:
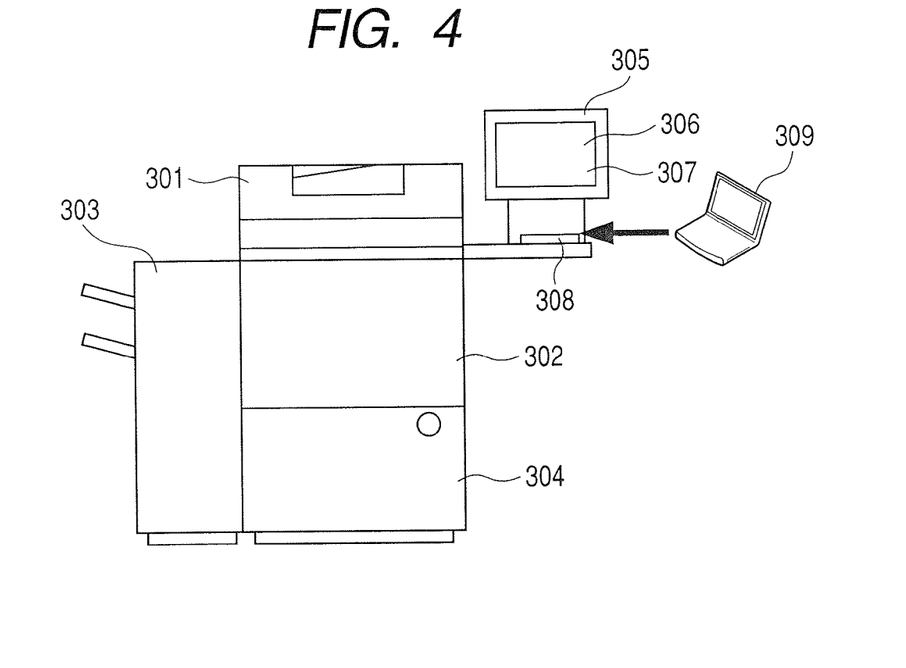
FIG. 4 illustrates an outline of the image processing apparatus according to an exemplary embodiment of the present invention.

FIG. 4 illustrates the outline of an image processing apparatus according to the exemplary embodiment of the present invention.

A scanner unit 301 is an apparatus that reads an original as electronic data, and corresponds to the scanner 119 illustrated in FIG. 1. The data read by the scanner unit 301 is processed by the scanner image processing unit 122 of the controller unit 100.

A printer unit 302 is an apparatus which prints image data on a recording medium, such as paper, and corresponds to the printer 121 illustrated in FIG. 1. A finisher 303 performs a finishing process, such as stapling, folding, etc., on the recording medium printed by the printer unit 302.

An operation unit panel 305 is provided with an LCD display unit 306 and a touch panel 307. The LCD display unit 306 and the touch panel 307 are arranged as superposed, and the image processing apparatus can understand the instruction of a user by the user touching an operation target, such as an icon displayed on the LCD display unit 306 through the touch panel 307. A device port 308 is a small table for setting down, among other things, a mobile terminal 309 capable of performing wireless communication. Since both the image processing apparatus and the mobile terminal 309 are capable of performing wireless communication, data can be wirelessly transferred between the two.

Next, an operation of fetching an arbitrary page of an original read by the image processing apparatus as image data to a document editor of the mobile terminal, and transmitting the document data to which the image data has been fetched using the FAX transmission function of the image processing apparatus is described.

First, a user sets the mobile terminal 309 on the device port 308 of the image processing apparatus. As described above, the image processing apparatus and the mobile terminal 309 are capable of wirelessly communication with one another. Next, an original to be fetched to a document editor of the mobile terminal 309 is scanned by the image processing apparatus.

Figure 5:
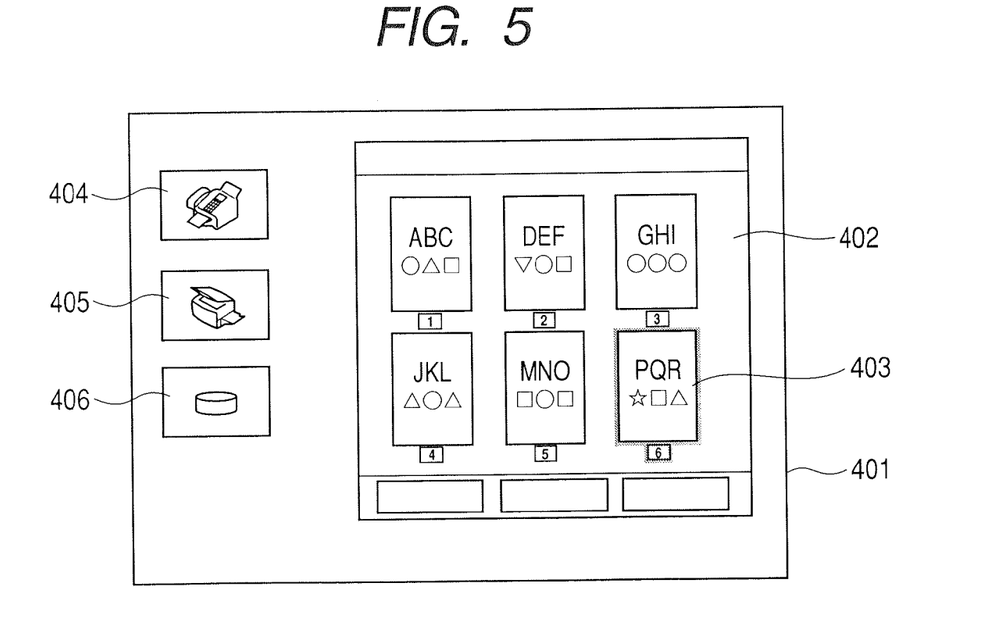
FIG. 5 illustrates an operation screen (or a display screen) displayed on an LCD display unit 306 of the image processing apparatus.

FIG. 5 illustrates the operation screen (or the display screen) displayed on the LCD display unit 306 of the image processing apparatus. A display screen 401 is displayed on the LCD display unit 306, and an operation target, such as an icon etc. displayed on the screen can be specified by the user through the touch panel 307.

In a scan image display area 402, an original read by the scanner unit 301 of the image processing apparatus and stored as electronic data on the HDD 104 etc. is described for each page. An image data icon 403 shows one page of the read data, and image data to be fetched to a document to be transmitted by FAX.

A FAX function icon 404 is specified by a user when a FAX function is to be activated. In order to active the function, a user drags the image data icon 403 to the FAX function icon 404, and a setting screen (not shown) for transmission of data by FAX is displayed. The user specifies a destination via the setting screen, and upon initiation of transmission, the data associated with the image data icon 403 is transmitted.

A print function icon 405 is specified by a user when a printer function is to be activated. In order to activate the function, a user drags the image data icon 403 to the print function icon 405, and a print setting screen is displayed (not shown). Using the print setting screen, a user sets a print condition and then initiates printing, where the data associated with the image data icon 403 is printed.

An HD storage function icon 406 is specified by a user when data is to be stored in a specific user area in an HD of an image processing apparatus. In order to initiate the storing function, a user drags the image data icon 403 to the HD storage function icon, and an HD storage setting screen is displayed (not shown). Using the HD storage setting screen, the user sets a storage area and a storage condition, and then initiates storing of the data, where the data associated with the image data icon 403 is stored.

Figure 6:
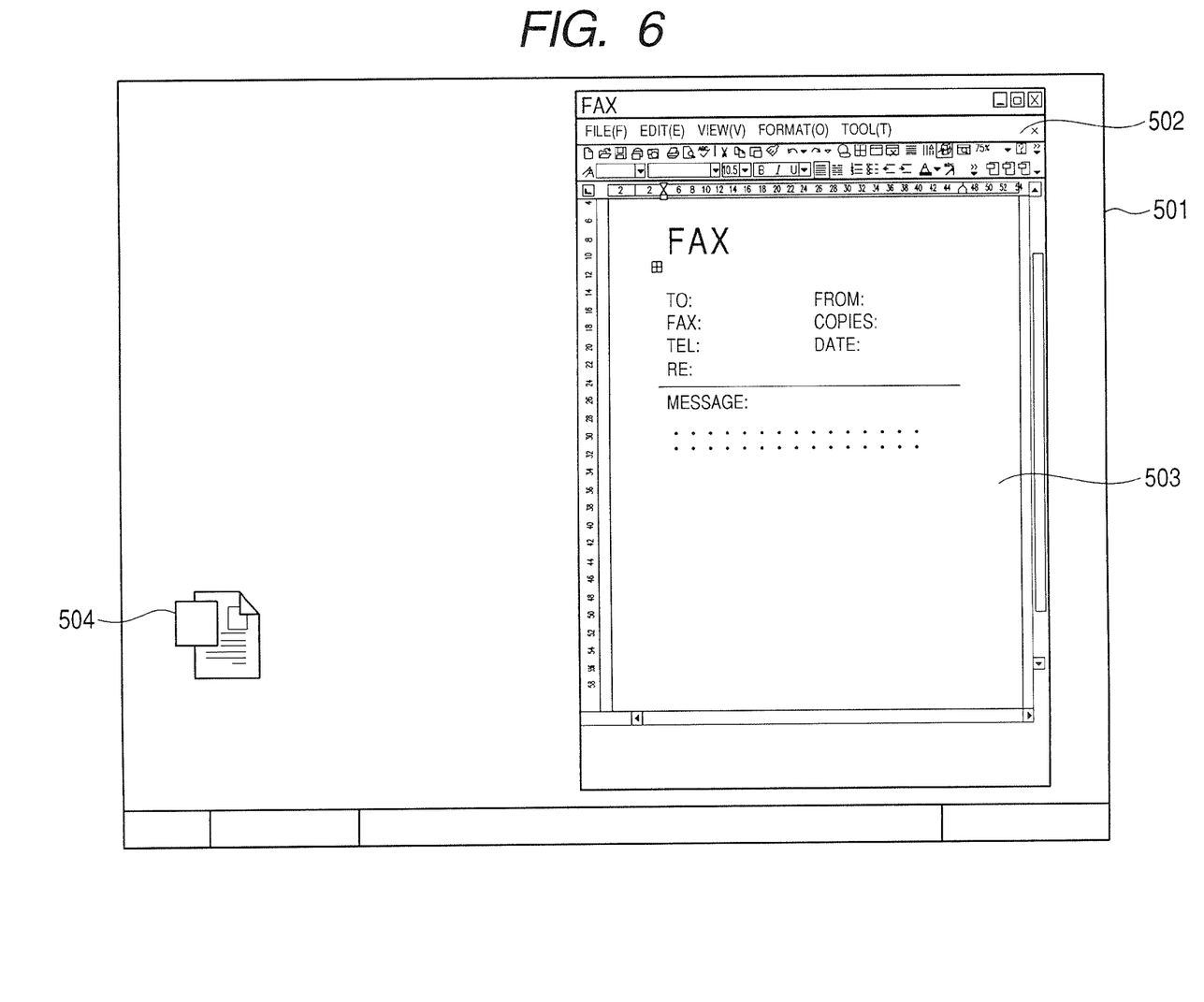
FIG. 6 illustrates an operation screen displayed on the operation unit of a mobile terminal 309.

FIG. 6 illustrates an operation screen displayed the mobile terminal 309. More specifically, a display screen 501 is provided for the user to specify an operation target. The operation target can either be specified via a user touching the display screen 501 or via a user using a pointing device such as a mouse.

A document editor screen 502 is an operation screen of an editor application for generating a document. The editor application can fetch an object, such as image data. A user can paste image data in a document being generated by dragging image data or an image file onto a document in the document editor screen. For example, assume that the user is pasting a piece of image data scanned by an image processing apparatus on the position specified by an image paste position 503 of the document specified on the document editor screen 502. A document file icon 504 is displayed as a document file being generated on the document editor screen 502.

To fetch the image data scanned by the image processing apparatus to the document editor (or a document file) of the mobile terminal 309, the user selects and specifies the image data icon 403 on the display screen 401 of the image processing apparatus. Next, on the display screen 501 of the mobile terminal 309, the user selects and specifies the image paste position 503 as a target location for pasting the image data.

The image processing apparatus and the mobile terminal 309 wirelessly communicate operation screen specification information, such as icon selection information etc., with each other when data can be communicated by wireless communication. Both the image forming apparatus and the mobile terminal 309 constantly check whether any operation has been performed in the other devices operation unit.

If either the image processing apparatus or the mobile terminal 309 determines that selection of an operation target has occurred in the other device and can be performed by both devices, then is communicated between the two, and the operation target selected by one is fetched to the function selected by the other.

As discussed above, the data corresponding to the image data icon 403 of the image processing apparatus can be transferred to the mobile terminal 309, and fetched to the document editor of the mobile terminal 309.

Figure 7:
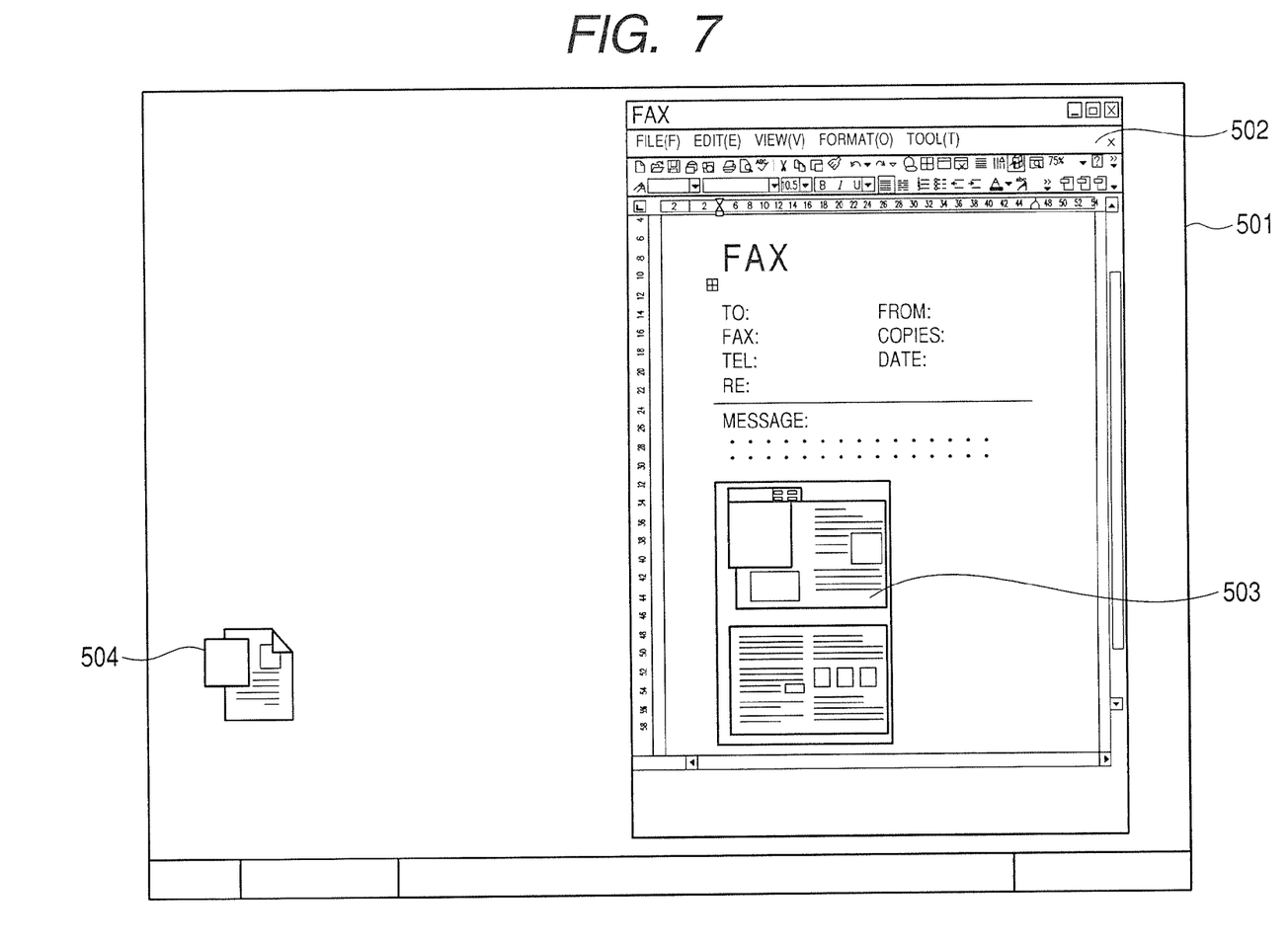
FIG. 7 illustrates an operation screen displayed on the operation unit of the mobile terminal 309.

FIG. 7 illustrates the operation screen displayed on the operation unit of the mobile terminal 309 after performing the above-mentioned operation.

The data of the image data icon 403 displayed on the display screen 401 of the image processing apparatus is transferred to the mobile terminal, and is pasted on the image paste position 503 of the document editor screen 502 on the display screen 501 in the mobile terminal.

Since the target image data is pasted on the document to be transmitted by FAX, the user temporarily stores the document. Then, the user selects and specifies the icon 504 indicating the document file storing the document on the display screen 501 in the mobile terminal 309.

Furthermore, the user selects and specifies the FAX function icon 404 on the display screen 401 of the image processing apparatus. That is, on the operation screen of the image processing apparatus, the user clicks the FAX function icon 404. In the above-mentioned process, the stored document file of the mobile terminal 309 is transferred to the image processing apparatus, and fetched for the process by the FAX function.

Figure 8:
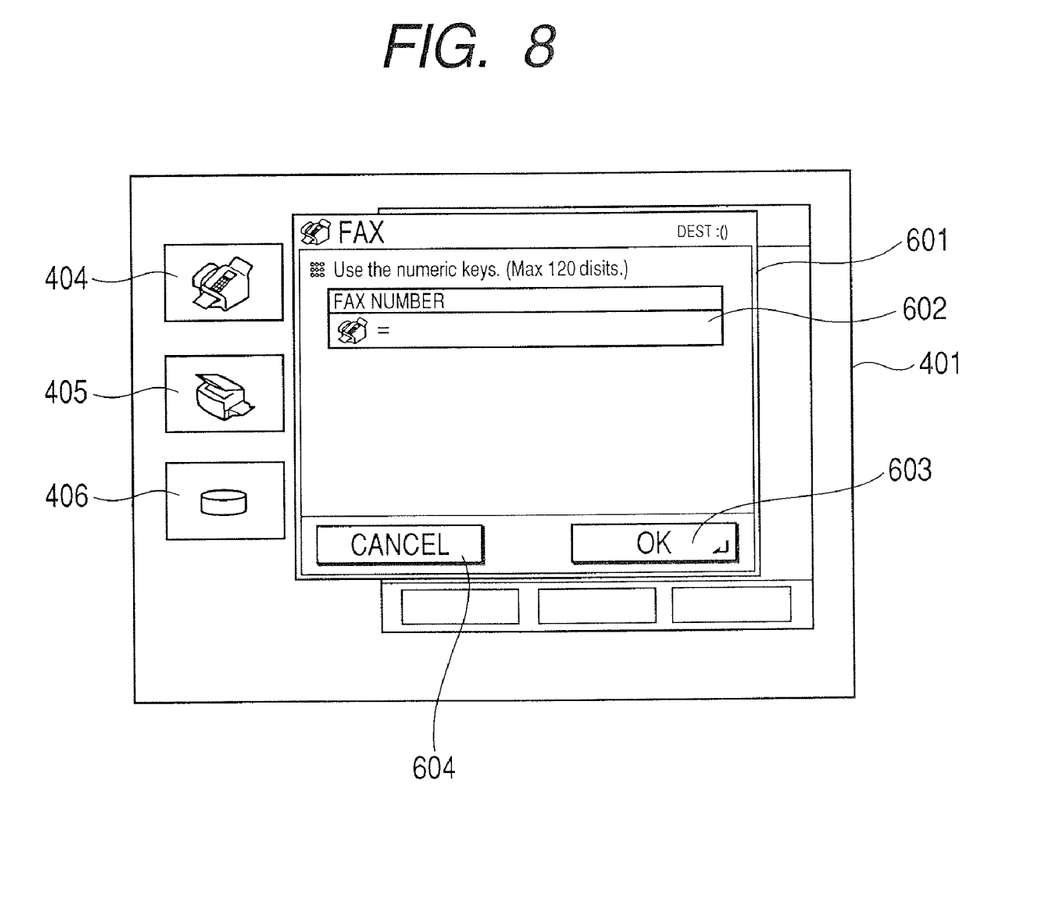
FIG. 8 illustrates an operation screen displayed on the LCD display unit 306 of the image processing apparatus.

FIG. 8 illustrates the operation screen displayed on the LCD display unit 306 of the image processing apparatus after performing the above-mentioned operation.

The document edited by the mobile terminal is fetched for the FAX function of the image processing apparatus, and a setting screen 601 for setting the transmission by FAX is displayed.

A destination number setting unit 602 displays the telephone number of a destination for transmission of data by FAX. A transmission determination button 603 is pressed and the destination is confirmed, and the document specified for the destination is transmitted by FAX. A cancel button 604 cancels the transmission by FAX when it is pressed.

By the specification in a series of operations, the image data of the image processing apparatus is transferred to the mobile terminal, and the document edited on the mobile terminal is transferred to the image processing apparatus, and then transmitted by FAX.

In the above-mentioned example, since the user selects the FAX function icon 404, the document edited on the mobile terminal is transmitted by FAX. However, if the user selects the print function icon 405, the document edited on the mobile terminal is printed on the printer of the image processing apparatus.

Thus, the user can easily and directly edit data and process an image only by sequentially selecting the icons indicating the respective process facilities without considering the data communication between the equipment devices.

Furthermore, as compared with the method of displaying on one device the process target icons and the process function icons of both devices, a device having a narrow operation display unit can display operations without the cost of a display area and visibility etc.

Figure 9:
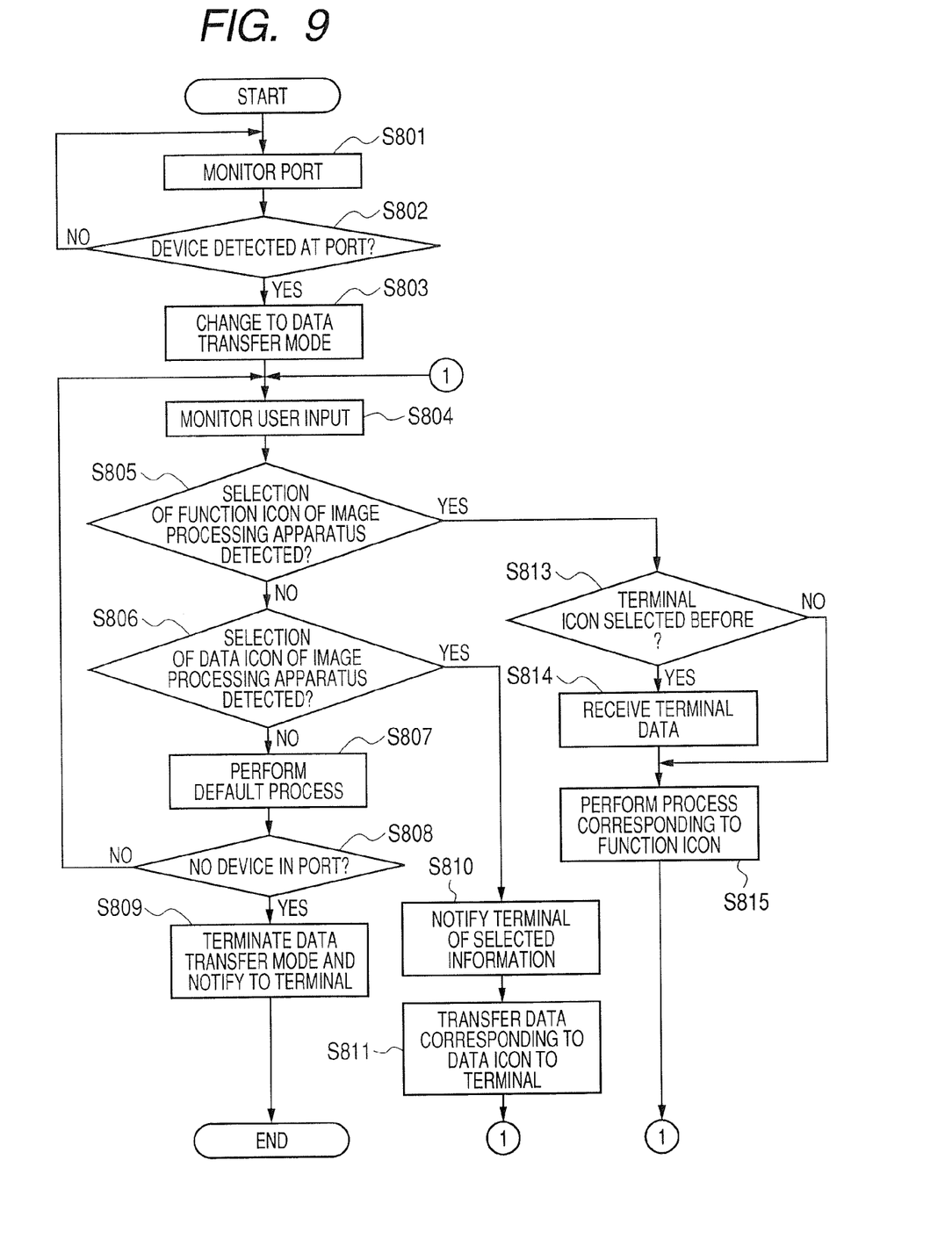
FIG. 9 is a flowchart of the process performed by the image processing apparatus.

FIG. 9 is a flowchart of the process performed by the image processing apparatus.

In step S801, the image processing apparatus monitors the device port 308. In step S801, the image processing apparatus detects a radio signal at a specific level and monitors whether a device for wireless communication has been set on the device port 308.

Then, in step S802, when a device, such as the mobile terminal 309 is detected at the device port 308, flow proceeds to step S803. If a device is not detected in step S802, flow returns step S801. While reference to the mobile terminal 309 as described above is made during the description of FIG. 9, any mobile device that would enable practice of the present invention is applicable.

In the present embodiment of the present invention, communication is performed with the mobile terminal 309 by wireless communication using the device port 308. However, communication can also be established with the mobile terminal 309 via the LAN 108 or WAN 110.

In step S803, the image processing apparatus changes to a data transfer mode. A data transfer mode refers not only to the operation by the operation unit of the image processing apparatus, but also to mutual communication of data with the operation of the operation unit of the mobile terminal 309 with which communications can be established. The image processing apparatus notifies the mobile terminal 309 of an instruction to change to the data transfer mode.

Next, in step S804, the image processing apparatus monitors any input specified by a user via the operation unit 106. Simultaneously, the image processing apparatus also monitors any input specified on the mobile terminal 309.

In step S805, the image processing apparatus determines whether an operation specification for function icon selection has been input from a user. A function icon refers to, for example, the FAX function icon 404, the print function icon 405, the HD storage function icon 406, etc. If it is determined that the operation specification by function icon selection has been input, then the flow proceeds to step S813.

In step S813, the image processing apparatus compares the history of the user operation selection information on the operation unit 106 with the selection information of the data icon notified by the mobile terminal 309. The image processing apparatus determines whether the icon of the mobile terminal 309 has been selected and specified before the function icon selection of the image processing apparatus.

If it is determined that the mobile terminal 309 has not selected or specified an icon before the function icon selection of the image processing apparatus, then the image processing apparatus performs the process in step S815. If it is determined that the mobile terminal 309 has selected and specified an icon before the function icon selection of the image processing apparatus, then the image processing apparatus performs the process in step S814.

In step S814, the image processing apparatus receives from the mobile terminal 309 the data corresponding to the icon selected before by the mobile terminal 309.

In step S815, the image processing apparatus performs the process corresponding to the function icon selected by the image processing apparatus on the data corresponding to the data icon selected before by the image processing apparatus. The data icon refers to, for example, the image data icon 403 etc. If no data has been received from the mobile terminal 309 or no data icon has been selected in the image processing apparatus, then the image processing apparatus performs no process. In the above-mentioned process, the image processing apparatus transmits the data of the mobile terminal 309 by FAX or prints the data. Flow then proceed back to step S804.

In step S805, if it is determined that no operation specification has been input by the function icon selection, then in step S806, the image processing apparatus determines whether the user has input operation specification of data icon selection via the operation unit 106.

If it is determined that the operation specification by data icon selection has been input, then the flow proceeds to step S810. In step S810, the image processing apparatus notifies the mobile terminal 309 of the information that a data icon has been selected. Then, in step S811, the image processing apparatus transmits the selected data corresponding to the data icon of the image processing apparatus to the mobile terminal 309 by wireless communication. Flow then proceeds back to step S804.

In step S806, if it is determined that the user has not input the operation specification of the data icon selection through the operation unit 106, then the image processing apparatus performs the process in response to various user input in step S807.

Then, in step S808, the image processing apparatus determines whether the wireless communication has been disconnected at the device port 308. That is, whether there is no mobile terminal 309 at the device port.

If it is determined that there the image processing apparatus is still in communication with the mobile terminal 309, then flow proceeds back to step S804.

In step S808, if it is determined that the image processing apparatus is not in communication with the mobile terminal 309, then flow proceeds to step S809. In step S809, the image processing apparatus terminates the data transfer mode of the image processing apparatus. Then, the image processing apparatus notifies the mobile terminal 309 of the termination of the data transfer mode.

Figure 10:
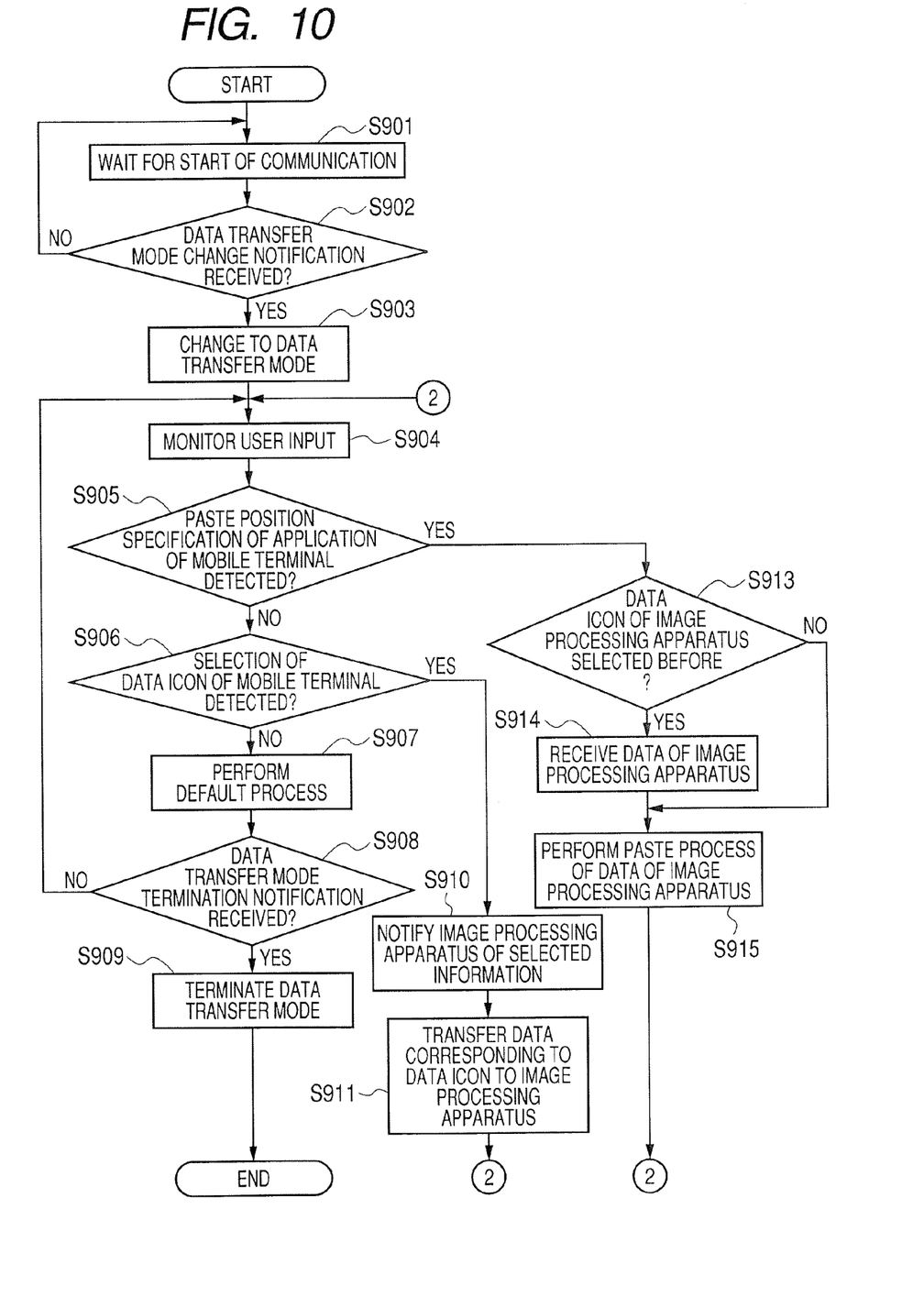
FIG. 10 is a flowchart of the process performed by the mobile terminal.

FIG. 10 is a flowchart of the process performed by the mobile terminal 309. As in the case of FIG. 9, mobile terminal 309 is referred to in the following discussion of FIG. 10. However, the process of FIG. 10 is applicable for any mobile device that would enable practice of the present invention.

In step S901, the mobile terminal 309 enters the standby state for the start of communication with the image processing apparatus. In step S902, the mobile terminal 309 determines whether the data transfer mode change notification has been transmitted from the image processing apparatus.

If the data transfer mode change notification has been transmitted from the image processing apparatus to the mobile terminal 309 in step S803 of FIG. 9, the mobile terminal 309 also changes to the data transfer mode in step S903. Then, in step S904, the mobile terminal 309 monitors the specification input from the user, as in step S804 of FIG. 9.

In step S905, the mobile terminal determines whether the operation specification of a paste position has been input. If it is determined that the operation specification of a paste position has been input, then in step S913, the mobile terminal 309 compares the history of the user operation selection information in the operation unit of the mobile terminal 309 with the selection information about the data icon informed from the image processing apparatus.

If the mobile terminal 309 determines that there is no data icon selection specification by the image processing apparatus before the operation specification of a paste position, then the mobile terminal 309 performs the process in step S915.

If the mobile terminal 309 determines that there is data icon selection specification by the image processing apparatus before the operation specification of a paste position, then the mobile terminal 309 performs the process in step S914. In step S914, the mobile terminal 309 receives from the image processing apparatus, by wireless communication, the data corresponding to the data icon selected by the image processing apparatus.

Then, in step S915, the mobile terminal 309 pastes, at the specified paste position of the application of the mobile terminal 309, the data received from the image processing apparatus or the data corresponding to the data icon selected before at the mobile terminal 309. If no data is received from the image processing apparatus or there is no data icon selected before the operation specification of a paste position at the mobile terminal 309, then the mobile terminal 309 performs no process. A data icon at the mobile terminal 309 corresponds to, for example, a document file icon illustrated in FIGS. 6 and 7.

In the above-described processes, the data of the image processing apparatus can be easily pasted at the paste position of the application of the mobile terminal 309.

In step S905, if it is determined that no operation specification of a paste position has been input, then the flow proceeds to step S906. In step S906, a determination is made whether the user has input operation specification of data icon selection. If it is determined that the user has input the operation specification of data icon selection, then the flow proceeds to step S910.

In step S910, the mobile terminal 309 notifies the image processing apparatus of the information about the selection of the data icon. Then, in step S911, the mobile terminal 309 transmits the data corresponding to the selected data icon of the mobile terminal 309 to the image processing apparatus by wireless communication. That is, in step S911, the mobile terminal 309 pastes the data transmitted from the image processing apparatus, and transmits the stored data of the document file to the image processing apparatus by wireless communication. Flow then returns to step S904.

In step S906, if it is determined that the operation specification of the data icon selection has not been input from the user, then the mobile terminal 309 performs the process for other various user input in step S907.

In step S908, the mobile terminal 309 determines whether the wireless communication with the image processing apparatus has been disconnected, whether a data transfer mode termination notification has been received from the image processing apparatus, or whether wireless communication termination specification has been received from the user.

If it is determined that there is a disconnection of wireless communication, a mode termination notification has been received, or the communication termination specification has been received from the user, then the mobile terminal 309 terminates the wireless communication and terminates the data transfer mode of the mobile terminal 309 in step S909.

Figure 11:
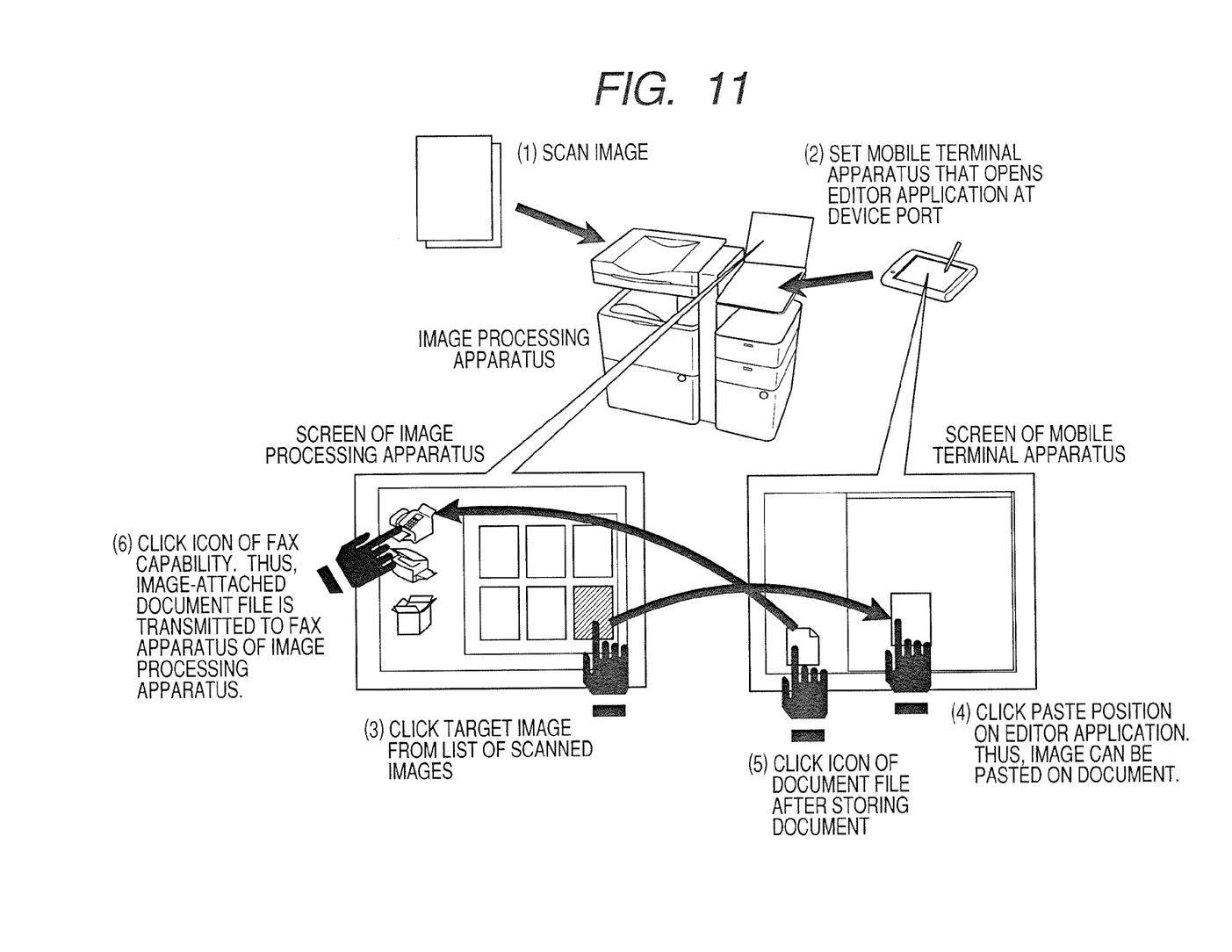
FIG. 11 illustrates an example of an operation of a user.

FIG. 11 illustrates an example of the operation of the user. As illustrated in FIG. 11, the user scans an image (or a document) at the image processing apparatus (1). Then, the user sets the mobile terminal apparatus (e.g., tablet PC) down, which opens an editor application at a port (2).

Then, the user clicks and selects a target image from a list of the scanned images on the screen of the image processing apparatus (3). Then, the user clicks the paste position on the editor application on the screen of the mobile terminal apparatus, and specifies the paste position (4). That is, the operations of (3) and (4) are copy and paste operations of the image by the user. In these operations, the image is pasted on the document.

Then, the user stores the image pasted document, clicks and selects the icon of the document (document file), on the screen of the mobile terminal apparatus (5). Then, the user clicks and selects, for example, the FAX function icon on the screen of the image processing apparatus (6). In these operations, an image pasted document file is transmitted to the FAX function of the image processing apparatus.

A recording medium (or storage medium) storing a program code of software for realizing the functions of the exemplary embodiment of the present invention can be supplied to the system or the apparatus. Then, the computer (or CPU, MPU) of the system or the apparatus reads and executes the program code stored in the recording medium. In this case, the program code itself that is read from the recording medium realizes the functions of the exemplary embodiment of the present invention, and the recording medium storing the program code configures the present invention. In addition, by the computer executing the read program code, the operating system (OS) etc. operating on the computer performs all or a part of the actual processes at an instruction of the program code.

Furthermore, the above-described exemplary embodiment can be realized by a program code, read from a recording medium, that is written to the memory in a feature expansion card inserted into a computer or in a feature expansion unit connected to a computer, where the feature expansion card and the feature expansion unit performing all or a part of the processes at an instruction of the program code.

When the present invention is applied to the recording medium, the recording medium stores the program code corresponding to the flowchart described above.

According to the above-described exemplary embodiment of the present invention, direct and easy operability can be realized by using the display units (or operation units) of both image processing apparatus and mobile terminal, thereby efficiently performing various image processing operations with the data transmitting/receiving operations between the image processing apparatus and the mobile terminal.

Furthermore, since it is not necessary to display a file or folder on both display units, data communication between the image processing apparatus and the mobile terminal can be easily specified by equipment provided with a display unit having a narrow display area or equipment having no window system without the cost of operability.

That is, the above-mentioned exemplary embodiments of the present invention can efficiently perform various image processing operations with data transmitting/receiving operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-234292, filed Aug. 30, 2006, which is hereby incorporated by reference herein in its entirety.

What is claimed is:

1. A system for image processing, the system comprising:
an image forming apparatus; and
a mobile terminal apparatus for communication with the image forming apparatus, wherein the mobile terminal apparatus comprises:
at least one processor programmed to control:
a first display unit;
a first display control unit configured to control the first display unit to display a data icon corresponding to image data to be transmitted to the image forming apparatus;
a first detection unit configured to detect a user's selection of the data icon displayed on the first display unit; and
a transmission unit configured to transmit the image data corresponding to the selected data icon to the image forming apparatus in response to the user's selection detected by the first detection unit,
wherein the image forming apparatus comprises:
at least one processor programmed to control:
a second display unit;
a second display control unit configured to control the second display unit to display a function icon corresponding to an image processing to be applied to the image data transmitted by the transmission unit;
a second detection unit configured to detect a user's selection of the function icon displayed on the second display unit;
a determination unit configured to determine, in response to the user's selection detected by the second detection unit, whether the user selects the data icon displayed on the first display unit before the selection of the function icon; and
a processing control unit configured to perform the image processing corresponding to the selected function icon on the image data transmitted by the transmission unit, if the determination unit determines that the user selects the data icon before the function icon, and to terminate processing without performing the image processing, if the determination unit does not determine that the user selects the data icon before the function icon.

2. The image forming system according to claim 1, wherein the image processing is processing in which the image data transmitted from the mobile terminal apparatus is sent to a predetermined destination using a facsimile function.

3. The image forming system according to claim 1, wherein the image processing is processing in which the image data transmitted from the mobile terminal apparatus is printed using a printing function.

4. A method for image processing carried out in a system for image processing that comprises an mobile terminal apparatus having a first display unit and a image forming apparatus, having a second display unit, wherein the mobile terminal communicates with the image forming apparatus, the method comprising:
controlling, in the mobile terminal apparatus, the first display unit to display a data icon corresponding to image data to be transmitted to the image forming apparatus;
detecting, in the mobile terminal apparatus, a user's selection of the data icon displayed on the first display unit; and
transmitting, from the mobile terminal apparatus to the image forming apparatus, the image data corresponding to the selected data icon in response to the detected user's selection;
controlling, in the image forming apparatus, the second display unit to display a function icon corresponding to an image processing to be applied to the transmitted image data;
detecting, in the image forming apparatus, a user's selection of the function icon displayed on the second display unit;
determining, in the image forming apparatus, in response to the user's selection detected in the second detecting step, whether the user selects the data icon displayed on the first display unit before the selection of the function icon; and
performing, in the image forming apparatus, the image processing corresponding to the selected function icon on the transmitted image data, if it is determined in the determining step that the user selects the data icon before the function icon, and terminating processing without performing the image processing, if it is not determined in the determining step that the user selects the data icon before the function icon.

5. The image forming method according to claim 4, wherein the image processing is processing in which the image data transmitted from the mobile terminal apparatus is sent to a predetermined destination using a facsimile function.

6. The image forming method according to claim 4, wherein the image processing is processing in which the image data transmitted from the mobile terminal apparatus is printed using a printing function.

7. A non-transitory computer-readable storage medium storing computer-executable process steps, the computer-executable process steps causing a computer to execute the method of claim 4.

8. An image forming apparatus comprising:
at least one processor programmed to control:
a display unit;
a display control unit configured to control the display unit to display a function icon corresponding to an image processing to be applied to image data received from an external device;
a detection unit configured to detect a user's selection of the function icon displayed on the display unit;
a determination unit configured to determine, in response to the user's selection detected by the detection unit, whether the user selects a data icon displayed on a display of the external device before selecting the function icon; and
a processing control unit configured to perform the image processing corresponding to the selected function icon on the image data received from the external device, if the determination unit determines that the user selects the data icon on the display of the external device before selecting the function icon, and to terminate processing without performing the image processing, if the determination unit does not determine that the user selects the data icon on the display of the external device before selecting the function icon.

* * * * *